United States Patent
Dubberke

(12) 
(10) Patent No.: US 6,399,133 B2
(45) Date of Patent: *Jun. 4, 2002

(54) REDUCED FAT AGGLOMERATED CHOCOLATE

(75) Inventor: Karin Dubberke, Dublin, OH (US)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/323,775

(22) Filed: Jun. 1, 1999

Related U.S. Application Data

(62) Division of application No. 09/042,687, filed on Mar. 12, 1998, now Pat. No. 6,117,478.

(51) Int. Cl.$^7$ ................................................. A23G 1/00
(52) U.S. Cl. ..................... 426/552; 426/565; 426/631
(58) Field of Search .............................. 426/306, 285, 426/631, 385, 552, 565

(56) References Cited

U.S. PATENT DOCUMENTS

| | | | | |
|---|---|---|---|---|
| 2,850,388 A | | 9/1958 | Peebles et al. ................. | 99/24 |
| 3,184,315 A | * | 5/1965 | Wolf ............................. | 99/23 |
| 4,394,395 A | * | 7/1983 | Rostagno .................... | 426/285 |
| 4,414,239 A | * | 11/1983 | Oven ......................... | 426/607 |
| 4,963,372 A | * | 10/1990 | Zumbe ........................ | 426/72 |
| 4,980,181 A | * | 12/1990 | Camp et al. .................. | 426/98 |
| 5,190,786 A | | 3/1993 | Anderson et al. ........... | 426/631 |
| 5,501,865 A | | 3/1996 | Zumbe et al. ............... | 426/548 |
| 5,505,982 A | * | 4/1996 | Krawczyk et al. .......... | 426/660 |
| 5,882,709 A | * | 3/1999 | Zumbe ....................... | 426/481 |

FOREIGN PATENT DOCUMENTS

| | | | |
|---|---|---|---|
| CA | 2007494 | | 7/1990 |
| GB | 1 527 240 | * | 12/1975 |

OTHER PUBLICATIONS

Websters Ninth New Collegiate Dictionary., Merriam—Webster Inc., pp. 64 and 1101, 1986.*
Minife, B., Chocolate, Cocoa, and Confectionery: Science and Technology, $3^{rd}$ edition, Chapman & Hall, pp. 183–197, 825–828.

* cited by examiner

*Primary Examiner*—Arthur L. Corbin
(74) *Attorney, Agent, or Firm*—Winston & Strawn

(57) ABSTRACT

A low fat agglomerated chocolate having an average particle size up to 5 mm and containing from 18 to 24% by weight fat based on the total weight of the chocolate and a reduced fat chocolate product, such as a chocolate bar, made from a mixture of from 60 to 90% of a reduced fat chocolate containing less than 27% fat and from 40 to 10% of a freeze-dried reduced fat agglomerated chocolate having an average particle size up to 5 mm and containing from 18 to 24% by weight fat based on the total weight of the chocolate. The products have a unique crunchy texture, melt easily and have a smooth texture in the mouth.

20 Claims, No Drawings

REDUCED FAT AGGLOMERATED CHOCOLATE

This is a division of application Ser. No. 09/042,687, filed Mar. 12, 1998, now U.S. Pat. No. 6,117,478.

FIELD OF THE INVENTION

The present invention relates to a reduced fat agglomerated chocolate and to a process for its preparation.

BACKGROUND OF THE INVENTION

Conventional milk chocolate contains about 30–31% fat. It may contain more or less but rarely less than 27% fat. Calorie-conscious consumers demand a chocolate with lower calories and one way of reducing the calories in chocolate is by reducing the fat content. However, there are technical difficulties in reducing the fat content of milk chocolate causing the quality, taste and texture to be inferior to that of conventional milk chocolate. For example, reduced fat milk chocolates usually give a dry and coarse mouthfeel and the viscosity is too high for normal handling during preparation.

In U.S. Pat. No. 5,932,277, the entirety of which is hereby incorporated by reference, I have described a reduced fat milk chocolate which has the same or better physical characteristics such as texture, mouthfeel (lubrication), snap, viscosity, handling (tempering, mould, enrobing), and gloss than a conventional milk chocolate, e.g. containing 30–31% by weight fat.

The reduced fat chocolate described in U.S. Pat. No. 5,932,277 is obtained by preparing a powdered premix of substantially all the non-fat ingredients (non-fat dry milk, non-fat cocoa powder and sucrose), adding up to 96% of the fat containing ingredients (cocoa butter, milk fat, cocoa liquor and up to 60% of the total lecithin) to the powdered premix and mixing to give a mass containing from 18% to 24% by weight fat based on the total weight of the mass, refining the mass on refining rollers to give a particle size of from 25 to 35 microns, adding the remainder of the fat containing ingredients and lecithin, conching and tempering to give a reduced fat milk chocolate containing less than 27% by weight of fat.

SUMMARY OF THE INVENTION

I have now found that if water is added to the above refined mass of milk chocolate ingredients having a particle size of from 25 to 35 microns containing from 18% to 24% by weight fat based on the total weight of the refined mass and freeze drying the mass, an agglomerated chocolate having an average particle size up to 5 mm is produced which surprisingly has a crunchy and light texture as well as having a unique eating sensation which melts easily and is smooth in the mouth.

According to the present invention there is provided a reduced fat agglomerated chocolate having an average particle size up to 5 mm and containing from 18% to 24% by weight fat based on the total weight of the chocolate.

DETAILED DESCRIPTION OF THE INVENTION

The average particle size of the agglomerate is preferably from 1 to 4 mm, especially from 2 to 3 mm.

The amount of fat contained in the reduced fat agglomerated chocolate is preferably from 19 to 20% by weight fat based on the total weight of the chocolate.

The reduced fat agglomerated chocolate having an average particle size up to 5 mm and containing from 18% to 24% by weight fat based on the total weight of the chocolate may be produced by preparing a powdered premix of substantially all the non-fat ingredients, adding up to 96% of the fat containing ingredients to the powdered premix and mixing to give a mass containing from 18% to 24% by weight fat based on the total weight of the mass, refining the mass on refining rollers to give a particle size of from 25 to 35 microns, adding water to the refined mass and mixing to form a homogeneous mass, freezing the mass, grinding the frozen mass into pieces having an average particle size of up to 30 mm, and freeze drying the pieces to give the reduced fat agglomerated chocolate.

The non-fat ingredients are conveniently non-fat dry milk, non-fat cocoa powder and sucrose, preferably used in conventional proportions, e.g. from about 7.5 to 22.5% by weight of non-fat dry milk, from about 1 to 5% by weight of non-fat cocoa powder and from about 40–55% by weight of sucrose.

Conveniently, lecithin is added to the powdered premix with the fat containing ingredients, preferably in an amount of up to 60% and more preferably from 20 to 40% by weight of the total lecithin normally used in a milk chocolate, e.g. 0.05 to 0.2% by weight based on the weight of the chocolate.

The fat containing ingredients are conveniently cocoa butter, milk fat, cocoa liquor.

The fat containing ingredients may be added in conventional proportions, e.g. from about 10 to 25% by weight of cocoa butter, 3 to 7% by weight of milk fat and from 5 to 15% by weight of cocoa liquor. Preferably, the fat containing ingredients are blended before adding to the premix.

The mass containing from 18% to 24% by weight fat based on the total weight of the mass, may be refined on 2, 3, or 5-roll refiners.

The amount of water added water to the refined mass is preferably from 10 to 50%, more preferably from 20 to 40% and especially from 25 to 35% by weight based on the weight of the refined mass. Preferably, the refined mass and water are mixed until a smooth homogeneous mass is obtained. The duration of the mixing may be, for example, from 2 to 60 minutes, preferably from 5 to 40 minutes and more preferably from 10 to 30 minutes.

After mixing the refined mass and water, the homogeneous mass is advantageously laid out in a sheet before being frozen. The thickness of the sheet may be from 5 mm to 40 mm and preferably from 7.5 to 15 mm. The frozen mass is preferably ground into pieces having an average particle size of from 1 to 6 mm.

The freeze drying may be earned out by any conventional freeze drying process under high vacuum, usually less than 5 mm Hg to give the reduced fat agglomerated chocolate.

The reduced fat agglomerated chocolate is extremely versatile and can be used as a finished product or as an ingredient. Examples of possible applications for the reduced fat agglomerated chocolate are as follows:

- in confectionery and chocolate inclusions or centers using larger pieces, for example, making 10 to 40 mm agglomerates which can be enrobed with chocolate or making 100 mm long sticks as a center for a candy bar. The characteristics are a unique light crunchy texture which melts like chocolate.
- ice cream inclusions or toppings for instance, for desserts, ice cream and cakes, etc.
- dry ice cream coating. The characteristics are a different appearance, crunchy pieces and reduced fat.

hot "real chocolate" mix. The characteristics are rich mouthfeel and flavor without adding milk.

out of the bag morsels with added vitamins and minerals (using larger agglomerates of from, for example, 10 to 40 mm.

in admixture with any other kind of chocolate in any proportions.

In particular, the reduced fat agglomerated chocolate may be added to a reduced fat chocolate such as described in my U.S. Pat. No. 5,932,277 and molded into a bar to give a crunchy chocolate bar having a reduced fat content and a unique crunchy texture and which melts easily giving a desirable soft mouthfeel.

Accordingly, the present invention also provides a reduced fat chocolate bar comprising a mixture of from 60 to 90% of a reduced fat chocolate containing less than 27% fat and from 40 to 10% of a reduced fat agglomerated chocolate having an average particle size up to 5 mm and containing from 18 to 24% by weight fat based on the total weight of the chocolate.

The reduced fat chocolate is preferably a product obtainable by a process as described and claimed in my U.S. Pat. No. 5,932,277.

Preferably, the reduced fat chocolate bar comprises a mixture of from 75 to 85% of the reduced fat chocolate containing less than 27% fat and from 25 to 15% of the reduced fat agglomerated chocolate The present invention further provides a process for preparing a reduced fat milk chocolate bar which comprises preparing a reduced fat agglomerated chocolate by the hereinbefore described process of the present invention, mixing from 10 to 40% by weight of the reduced fat agglomerated chocolate with from 90 to 60% of a tempered reduced fat chocolate containing less than 27% fat and molding the mixture into the reduced fat milk chocolate bar The tempered reduced fat chocolate is obtained by preparing a powdered premix of substantially all the non-fat ingredients, adding up to 96% of the fat containing ingredients to the powdered premix and mixing to give a mass containing from 18 to 24% by weight fat based on the total weight of the mass, refining the mass on refining rollers to give a particle size of from 25 to 35 microns, adding the remainder of the fat containing ingredients and lecithin, conching, tempering to give a reduced fat chocolate containing less than 27% by weight of fat. Further details of the preparation of the reduced fat chocolate are described in my U.S. Pat. No. 5,932,277.

EXAMPLES

The following Examples further illustrate the present invention. Parts and percentages are given by weight.

Example 1

Preparation of the Low Fat Agglomerated Chocolate 50.16 parts of sucrose, 18.72 parts of skimmed milk powder and 1.51 parts of non-fat cocoa powder are blended in a Hobart mixer to form a premix. 10.01 parts of cocoa liquor, 15.17 parts of deodorized cocoa butter and 4.11 parts of anhydrous milk fat are mixed in a Hobart mixer to give a fat blend. 77% of the fat blend together with 0.1 parts of lecithin are added to the premix and the whole blended in a Hobart mixer to give a mass containing 19.15% fat.

The mass is refined on a 3-roll refiner to give a refined reduced fat material having a particle size of 29 microns.

Water is added to the refined reduced fat material in an amount of 30% and mixed for 10 minutes to give a smooth homogeneous mass. The mass is laid out in a sheet having a thickness of 10 to 20 mm which is then frozen. The frozen mass is ground into pieces having an average particle size of 2.5 mm which are then freeze-dried under a vacuum of less than 5 mm Hg to give dry agglomerates of chocolate having a fat content of 19.15% and an average particle size of 2.5 mm.

The freeze dried chocolate contains 54.15 parts sucrose, 20.21 parts skimmed milk powder, 10.80 parts cocoa liquor, 13.11 parts of cocoa butter and milk fat, 1.63 parts of non-fat cocoa powder and 0.11 parts lecithin.

The agglomerates have a crunchy and light texture, they melt easily and are smooth in the mouth giving a unique eating sensation.

Example 2

Preparation of a Reduced Fat Crunchy Milk Chocolate Bar 50.16 parts of sucrose, 18.72 parts of skimmed milk powder and 1.51 parts of non-fat cocoa powder are blended in a Hobart mixer to form a premix. 10.01 parts of cocoa liquor, 15.17 parts of deodorized cocoa butter and 4.11 parts of anhydrous milk fat are mixed in a Hobart mixer to give a fat blend. 77% of the fat blend together with 0.1 parts of lecithin are added to the premix and the whole blended in a Hobart mixer to give a mass containing 19.15% fat.

The mass is refined on a 3-roll refiner to give a refined reduced fat material having a particle size of 29 microns. The refined reduced fat material is loaded into the conche, together with a further 17% of the total fat blend and 0.03 parts of lecithin. The material is conched at 178° F. (80° C.) for 5.5 hours and then the remainder of the fat blend, 0.17 parts of lecithin and 0.02 parts of vanillin is added and the whole material conched for a further 0.5 hours, and finally tempered to give a reduced fat chocolate having a fat content of 25.41%.

25 parts of the agglomerates prepared in Example 1 (75% of which have an average particle size of 2.36–3.36 mm and 25% of which have an average particle size larger than 3.36 mm) are added to 75 parts of the above tempered reduced fat chocolate. The materials are mixed together in a bowl to avoid damaging the agglomerates and then molded into a chocolate bar to give a milk chocolate having a fat content of 23.83%.

The crunchy chocolate bar has a unique crunchy texture and which melts easily giving a desirable soft mouthfeel.

What is claimed is:

1. Freeze-dried particles of reduced fat agglomerated chocolate having a crunchy texture and an average particle size up to 5 mm, and containing from 18 to 24% by weight fat based on the total weight of the chocolate.

2. The particles of claim 1 wherein the average particle size is from 1 to 4 mm.

3. The particles of claim 1 wherein the amount of fat contained in the chocolate is from 19 to 20% by weight based on the total weight of the chocolate.

4. A dessert, ice cream, or cake containing freeze-dried particles of reduced fat agglomerated chocolate as inclusions or a topping, the particles having a crunchy texture and an average particle size up to 5 mm, and containing 18% to 24% by weight fat based on the total weight of the chocolate.

5. The dessert, ice cream or cake of claim 4 wherein the average particle size of the reduced fat agglomerated chocolate is from 1 to 4 mm.

6. The desert, ice cream or cake of claim 4 wherein the amount of fat contained in the chocolate is from 19 to 20% weight based on the total weight of the chocolate.

7. An ice cream provided with freeze-dried particles of reduced fat agglomerated chocolate as a dry, particulate coating, the particles having a crunchy texture and an average particle size up to 5 mm, and containing 18% to 24% by weight fat based on the total weight of the chocolate.

8. The ice cream of claim 7 wherein the average particle size of the reduced fat agglomerated chocolate is from 1 to 4 mm.

9. The ice cream of claim 7 wherein the amount of fat contained in the chocolate is from 19 to 20% by weight based on the total weight of the chocolate.

10. A hot chocolate mix consisting essentially of freeze-dried particles of reduced fat agglomerated chocolate having a crunchy texture and an average particle size up to 5 mm, and containing 18% to 24% by weight fat based on the total weight of the chocolate.

11. The hot chocolate mix of claim 10 wherein the average particle size of the reduced fat agglomerated chocolate is from 1 to 4 mm.

12. The hot chocolate mix of claim 10 wherein the amount of fat contained in the chocolate is from 19 to 20% by weight based on the total weight of the chocolate.

13. Chocolate morsels comprising reduced fat agglomerated freeze-dried chocolate particles having a crunchy texture and an average particle size up to 5 mm, and containing 18% to 24% by weight fat based on the total weight of the chocolate, the morsels including one or more vitamins or minerals and having an average size of 10 mm to 40 mm.

14. The chocolate morsels of claim 13 wherein the average particle size of the reduced fat agglomerated chocolate is from 1 to 4 mm.

15. The chocolate morsels of claim 13 wherein the amount of fat contained in the chocolate is from 19 to 20% by weight based on the total weight of the chocolate.

16. A confectionery or chocolate product comprising freeze-dried particles of a reduced fat agglomerated chocolate as inclusion or centers, the particles having a crunchy texture and an average particle size up to 5 mm, and the chocolate containing from 18 to 24% by weight fat based on the total weight of the chocolate.

17. The product of claim 16 wherein the agglomerated chocolate particles are enrobed with conventional chocolate.

18. The product of claim 17 in the form of a stick or bar.

19. Freeze-dried particles of reduced fat agglomerated chocolate having a crunchy texture and an average particle size up to 5 mm, and containing from 18 to 24% by weight fat based on the total weight of the chocolate, the particles prepared by a process which comprises preparing a powdered premix of non-fat ingredients which at least include dry milk and cocoa, adding up to 96% of fat containing ingredients to the powdered premix and mixing to provide a mass containing from 18 to 24% by weight fat based on the total weight of the mass, refining the mass to a particle size of from 25 to 35 microns, adding water to the refined mass and mixing to form a homogenous mass, freezing the homogenous mass, grinding the frozen mass into pieces having an average particle size of up to 10 mm, and freeze drying the ground pieces to obtain the particles.

20. The particles of claim 19 having an average particle size of from 1 to 4 mm and wherein the amount of fat contained in the chocolate is from 19 to 20% by weight based on the total weight of the chocolate.

* * * * *